(12) United States Patent
Ohashi et al.

(10) Patent No.: US 7,771,668 B2
(45) Date of Patent: Aug. 10, 2010

(54) CONTINUOUS OPERATION TYPE ACTIVE CHARCOAL PRODUCING APPARATUS AND PROCESS

(75) Inventors: Hiroaki Ohashi, Fukushima-Ken (JP); Yasuyoshi Yamanobe, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 466 days.

(21) Appl. No.: 11/921,003

(22) PCT Filed: May 15, 2006

(86) PCT No.: PCT/JP2006/309659

§ 371 (c)(1),
(2), (4) Date: Nov. 26, 2007

(87) PCT Pub. No.: WO2006/126412

PCT Pub. Date: Nov. 30, 2006

(65) Prior Publication Data

US 2009/0081114 A1  Mar. 26, 2009

(30) Foreign Application Priority Data

May 25, 2005  (JP) .............................. 2005-152356

(51) Int. Cl.
*B01J 8/18* (2006.01)
*F27B 15/08* (2006.01)
*C01B 31/08* (2006.01)

(52) U.S. Cl. ....................... 422/142; 422/139; 422/143; 422/147; 422/220; 502/418; 502/431; 502/432; 423/460

(58) Field of Classification Search ................. 422/139, 422/142, 143, 147, 220; 502/418, 431, 432; 423/460
See application file for complete search history.

(56) References Cited

U.S. PATENT DOCUMENTS 3,910,849 A 10/1975 Kawabata et al.
5,158,754 A * 10/1992 Lefers et al. ................ 422/191

FOREIGN PATENT DOCUMENTS

JP 49-91098 8/1974
JP 01-129093 5/1989

* cited by examiner

*Primary Examiner*—Walter D Griffin
*Assistant Examiner*—Lessanework Seifu
(74) *Attorney, Agent, or Firm*—Wenderoth, Lind & Ponack, L.L.P.

(57) ABSTRACT

A vertical multi-stage fluidized bed apparatus including a plurality of horizontal perforated partitioning plates disposed therein so as to partition the apparatus is provided, wherein an upper horizontal perforated partitioning plate is set to have a larger aperture rate than a lower horizontal perforated partitioning plate. From a lower part of the apparatus, feed carbon and fluidizing gas are continuously supplied so as to provide a gas superficial velocity in the fluidized bed which is 2-4 times a minimum fluidizing velocity of the feed carbon, thereby subjecting the feed carbon to fluidization with the fluidizing gas and activation with steam at 750-950° C. simultaneously to discharge activated carbon continuously from an upper part of the apparatus. As a result, activated carbon of even a high degree of activation is produced at a high yield comparable to that obtained in a batchwise operation.

11 Claims, 2 Drawing Sheets

US 7,771,668 B2

CONTINUOUS OPERATION TYPE ACTIVE CHARCOAL PRODUCING APPARATUS AND PROCESS

TECHNICAL FIELD

The present invention relates to an improvement in apparatus and process for continuous production of activated carbon according to the steam activation process using a vertical multi-stage fluidized bed apparatus partitioned by a plurality of horizontal perforated partitioning plates.

BACKGROUND ART

Steam activation reaction for production of activated carbon or active charcoal is ordinarily performed by causing steam to react on starting or feed carbon at a high temperature of 750-950° C. to result in fine pores in the feed carbon through water gas reaction, thereby producing activated carbon. As the apparatus for producing activated carbon, a rotary kiln, a moving bed, a fluidized bed, etc., have been conventionally used. Among these, a fluidized bed is characterized by a fast heat-exchange speed to provide a uniform particle temperature as a whole. Accordingly, a batchwise operation thereof affords a uniform reaction in the entire apparatus and can obviate unnecessary waste of carbon even in the case of production of a highly active activated carbon requiring a long reaction time through a uniform conversion free from a fraction of insufficient conversion or a fraction of excessive conversion, thus allowing the production of activated carbon at a high yield for an identical conversion.

The batchwise operation affording a further uniform reaction time requires such an operation as to initiate the reaction by heating the furnace after feeding the starting carbon and discharge the activated carbon, after cooling the furnace after the reaction. This requires the raising and lowering of the apparatus temperature for each batch, thus resulting in much loss of time and energy. Further, the temperature change causes heat stress distortion, thus being liable to cause problems such as deterioration of furnace structure and materials.

These problems can be alleviated by a continuous operation, which however is accompanied with a mixing state in the fluidized bed close to a complete mixing state, thus resulting in a product including a mixture of different conversion fractions. For preventing the problem by minimizing the mixing in the process flow direction to provide a residence time distribution in the apparatus, it has been known effective to divide the apparatus into a series of multiple stages (Terukatsu MIYAUCHI, Shin Kagaku Kohza (New Chemical Lecture) 14, "Ryu-kei Sousa to Kongoh Tokusei (Flow-system Operation and Mixing Properties), pp. 14-18 and p. 24, published from Nikkan Kogyo Shinbunsha (1960)). However, in order to obtain a uniform conversion as obtained by a batchwise operation, a large number of stages as many as several tens of stages, is required and is not realistic.

JP49-91098A discloses a process for continuous production of activated carbon using a vertical multi-stage fluidized bed apparatus partitioned by a plurality of perforated partitioning plates. More specifically, utilizing a phenomenon that the particle size of feed carbon is reduced along with the progress of activation reaction, JP49-91098A uses a continuously operated fluidized bed furnace in which horizontal perforated partitioning plates having perforations at a size of 2-4 times as large as a maximum particle size of the feed carbon at an aperture rate of 20-30% are disposed and the feed carbon is fluidized at a velocity of several times the minimum fluidization velocity of the feed carbon. The JP reference describes that, as a result thereof, each stage of activation chamber is provided with a certain length of space between a stack portion of carbon particles and a horizontal perforated plate immediately thereabove, and carbon particles caused to have reduced sizes due to progress of activation in the fluidized bed are selectively and consecutively transferred to above the partitioning plate, thus providing activated carbon having a very narrow distribution of residence time, i.e., reaction time. However, if this process is applied to production of a high-performance activated carbon having a high degree of activation, it has been found that the activated carbon cannot be obtained at a desired yield (as shown in Comparative Example 2 appearing hereinafter).

DISCLOSURE OF INVENTION

Accordingly, a principal object of the present invention is to provide an apparatus and a process by which even activated carbon at a high degree of activation can be continuously produced at a high yield.

More specifically, according to the present invention, there is provided a continuous operation type apparatus for producing activated carbon, comprising a vertical multi-stage fluidized bed apparatus including a plurality of horizontal perforated partitioning plates disposed therein so as to partition the apparatus, for continuously supplying feed carbon and a fluidizing gas containing steam from a lower part of the apparatus to fluidize the feed carbon with the fluidizing gas and activate the feed carbon with steam, and discharging activated carbon from an upper part of the apparatus, wherein an upper horizontal perforated partitioning plate is set to have a larger aperture or perforation rate than a lower horizontal perforated partitioning plate.

The present invention further provides a process for producing activated carbon, comprising: providing a vertical multi-stage fluidized bed apparatus including a plurality of horizontal perforated partitioning plates disposed therein so as to partition the apparatus, of which an upper horizontal perforated partitioning plate is set to have a larger aperture or perforation rate than a lower horizontal perforated partitioning plate, continuously supplying, from a lower part of the apparatus, feed carbon and fluidizing gas containing steam at a superficial velocity of the gas which is 2-4 times a minimum fluidizing velocity of the feed carbon, thereby to fluidize the feed carbon and activate the feed carbon with steam at 750-950° C., and continuously discharging the activated carbon from an upper part of the apparatus.

A brief history of the study with the above-mentioned object through which the present inventors have arrived at the present invention, will be described below.

In the course of study with the above-mentioned object, the present inventors have acquired a presumption that the reason why the above-mentioned process of JP49-91089A has failed to provide a desired yield when applied to production of activated carbon at a high degree of activation may be attributable to a lowering in terminal velocity of carbon material due to a decrease in particle size and a lowering in specific gravity thereof along with the progress of carbon activation reaction and an increase by ten and several percents of fluidizing gas in the apparatus along with the progress of water gas reaction for the activation, so that at a fixed aperture rate for the plurality of horizontal perforated partitioning plates as in JP49-91098A, there may be liable to result in an insufficient velocity of fluidizing gas through perforations relative to terminal velocity of carbon particles for a lower horizontal perforated partitioning plate and an excessive velocity of fluidizing gas through perforations relative to carbon particles (product activated carbon) for an upper horizontal perforated partitioning plate, both leading to lowering in rectifying and classification effects.

As a more specific explanation, for the production of activated carbon, for example, by treating starting carbon showing a minimum fluidization velocity of 0.074 m/s, a median-average particle size (calculated from particle sizes measured according to JIS K1474: particle size measurement method) of 620 μm and a particle packing bulk density (measured according to JIS K1474: manual packing density measurement method) of 778 kg/m$^3$ to produce activated carbon showing a terminal velocity of 1.2 m/s, a median-average particle size of 400 μm and a particle packing bulk density of 500 kg/m$^3$, the terminal velocity of the activated carbon becomes 16 times the minimum fluidization velocity of the feed carbon. In this instance, if horizontal perforated partitioning plates having an aperture rate of 20% (a lower limit of the range recommended by JP49-91098A) are used and the fluidizing gas feed rate is set to provide a gas superficial velocity of 0.35 m/s which is ca. 5 times the minimum fluidization velocity of the feed carbon, the linear velocity through perforations of the uppermost horizontal perforated partitioning plate is calculated to be 1.75 m/s but is actually 1.15 times thereof, i.e., 2.0 m/s, due to increase of the gas as a result of increase by the activation. Accordingly, the velocity is liable to exceed the terminal velocities of activated carbon of 1.2-2.0 m/s at an upper part of the apparatus to result in mixing of the activated carbon, so that the activated carbon discharged out of the upper part of the apparatus is also liable to include such a mixture of activated carbon. On the other hand, if the gas velocity through perforations of the uppermost horizontal perforated partitioning plate is reduced down to 1.2 m/s which does not exceed the terminal velocity of activated carbon, the superficial velocity based on the feed gas flow rate at a lower part becomes 0.21 m/s, whereas in this case, the effect of partitioning the fluidized bed is diminished to result in a state where fractions of different conversions are liable to be contained in the activated carbon. If the aperture rate is increased up to 30%, the upper limit recommended by JP49-91098A, the fluidized bed-partitioning effect is further lowered. To the contrary, if the aperture rate is decreased, the fluidized bed-partitioning effect is increased but as discussed above, the gas velocity becomes excessive at the uppermost stage so that fractions of different conversions are liable to mix with each other at an upper part of the apparatus. Further, if the gas flow rate is decreased, the fluidized state is at the lower layer becomes worse.

Then, the present inventors have acquired a concept that it is effective in order to solve the above-mentioned problem to increase the aperture rate of an upper horizontal perforated partitioning plate compared with a lower horizontal perforated partitioning plate, thereby effecting a relative decrease in fluidizing gas velocity through the perforations, in view of the above-mentioned lowering in terminal velocity of carbon particles and increase in fluidizing gas volume along with the progress of activation reaction, and have confirmed the effect thereof through experiments (as shown in Examples described hereinafter) to arrive at the present invention.

BEST MODE FOR PRACTICING THE INVENTION

Hereinbelow, the present invention will be described more specifically with reference to preferred embodiments thereof.

FIG. 1 is a layout view of an embodiment of the continuous operation type apparatus for producing activated carbon according to the present invention (including a schematic sectional view of a vertical apparatus main body 2). Feed carbon is supplied from a starting material supplier 1 equipped with a stirrer 1a to a part close to a bottom of an activated carbon production apparatus main body 2 through a starting material feed tube 3 disposed substantially vertically in the apparatus main body 2. Further, the vertical apparatus main body 2 is provided with a plurality (e.g., 4 in the embodiment shown in FIG. 1) of horizontal perforated partitioning plates 4 disposed therein with an appropriate spacing therebetween together with a disperser 5 further below them at a part close to the bottom for fluidizing gas containing steam.

A steam-containing fluidizing gas introduced for activation reaction and fluidization of the feed carbon is heated by a fluidizing gas heater 6 to a prescribed temperature detected and controlled by a temperature indicating controller 7a and supplied in dispersion into the apparatus main body 2. With the heated fluidizing gas, the feed carbon introduced through the starting material feed tube 3 is caused to form a vertical continuous-type fluidized bed. Within the fluidized bed, the feed carbon is activated according to water gas reaction at a high temperature of 750° C. or higher (detected by a thermometer 7d) by heat supplied from the fluidizing gas and by direct heating of the furnace through a heater 8 disposed on the side wall of the apparatus and operated at a temperature indicated by and under a control of temperature-indicating controllers 7b and 7c. Activated carbon thus produced after the reaction in the fluidized bed is discharged from an uppermost part of the fluidized bed through an activated carbon-discharge tube 9 disposed almost vertically in the apparatus main body 2 to outside the apparatus main body, cooled by a cooler 10 and then recovered by an activated carbon recovery vessel 11.

In the embodiment shown in FIG. 1, the fluidized bed in the apparatus main body 2 is partitioned by 4 horizontal perforated partitioning plates 4 to be divided into 5 zones, and the aperture rates of the plates are set so to be larger for the downstream side than the upstream side with respect to the feed carbon and fluidizing gas moving upwards in the apparatus main body 2 (as for the position in the apparatus main body 2, larger at the upper side than the lower side). The number of the horizontal perforated partitioning plates 4 is plural, i.e., at least 2, and in case where the number is 3 or larger, the aperture rates are preferably be set to be increased stepwise along with the progress toward the downstream sides. For example, in the embodiment of FIG. 1 using 4 horizontal perforated partitioning plates 4, the aperture rates are set to 9%, 12%, 15% and 18%, successively increased from the upstream to the downstream, but may be set to, e.g., 10%, 10%, 16% and 16%, as desired so as to provide a less number of steps of increased aperture rates than the number of horizontal perforated partitioning plates while retaining the effect of the present invention to some extent.

As for the fluidizing gas disperser 5, various types have been known, such as a flat sheet-type, a cap-type, a pipe-type and a cone-type (e.g., as described at page 481 of "Kagaku Kogaku Binran (Chemical Engineer's Handbook) Revised 6th Ed.", and any type of disperser can be used as far as a stable fluidized bed can be formed. Among these, however, a pipe-type gas disperser is particularly preferred because it is durable against use for a long period at high temperatures and also excellent in maintenance of the facility inclusive of prevention of clogging of gas ejection holes.

As for the starting material feed tube 3, in addition to the flow-down blowing-in type as shown in FIG. 1, it is also possible to use a screw, etc., for directly injecting the starting material to a lower part of fluidized bed through a side wall of the apparatus main body 2. The tip position of the feed tube 3 is ordinarily above the disperser 5 but, even if it is slightly therebelow, the system can still be operated. Further, the activated carbon discharge tube 9 can also be disposed so as to discharge the activated carbon from above the fluidized bed through a side wall of the apparatus main body 2 directly outside the apparatus.

The feed carbon may be obtained by subjecting a carbon precursor to a pretreatment for preliminary carbonization in an inert gas atmosphere of, e.g., nitrogen, at 500-800° C., wherein examples of the carbon precursor may include: coal-origin carbonized products, such as coal, lignite, brown coal and peat; plant-origin carbonized products, such as charcoal and coconut shell charcoal; carbonized products obtained by heat-treating a thermosetting resin such as phenolic resin; and infusibilized products formed from a thermoplastic resin such as polystyrene resin, or petroleum pitch, by oxidation-infusibilization (i.e., infusibilization by oxidation) or by crosslinking-infusibilization by adding a crosslinking compound such as divinylbenzene. By such a pretreatment, a feed carbon allowing a stable operation free from generation of tar from the feed carbon during the activation reaction can be obtained. Among the feed carbons described above, the carbonized products originated from a thermosetting resin and the carbonized products of infusibilized thermoplastic resin or petroleum pitch are high-purity carbonaceous feed carbons and are particularly preferred because they can provide an activated carbon with such a high degree of activation as to exhibit a terminal velocity which is as high as 15-20 times the minimum fluidization velocity without causing the fragility of the product activated carbon.

Further, the activation temperature (detected by the thermometer 7d) is generally 750-950° C., preferably 800-900° C. Below 750° C., the activation reaction velocity becomes very slow undesirably. In excess of 950° C., the reaction velocity becomes excessively large so that the diffusion of steam into the feed carbon cannot follow the reaction velocity to result in a gradient of steam concentration in the feed carbon, thus failing to achieve uniform activation. Further, also from the viewpoint of maintaining a good fluidized state, there is a suitable range for the flow rate of steam supplied as fluidizing gas, by which the reaction velocity is also restricted, so that an operation outside the above-mentioned temperature range is uneconomical.

The fluidizing gas may preferably comprise 30-100 vol. % of steam and the remainder of an inert gas such as nitrogen. However, it is also possible to include up to 15 vol. % of a reactive gas such as oxygen, as desired, e.g., for the purpose of modifying the property of the product activated carbon.

Details of apparatus designing are described. The present inventors first performed experiments of batchwise reaction to confirm the reaction states and physical properties of the object activated carbon. In the batchwise operation, a feed carbon having a median-average particle size ($d_{50}$) of 620 μm and a standard deviation (δ) of 130 μm (both calculated from a particle size distribution measured according to JIS K1474: particle size measurement method) and a packing bulk density of 778 kg/m$^3$ (measured according to JIS K1474: manual packing density measurement method) was activated by contact with a mixture gas of 10 vol. % of nitrogen and 90 vol. % of steam at 820° C. to obtain a spherical activated carbon having a median-average particle size ($d_{50}$) of 400 μm, a standard deviation (δ) of 95 μm and a packing bulk density of 500 kg/m$^3$. Based on the experimental result, a continuous apparatus was designed. The feed carbon was immersed in water whereby the particle density (apparent density) was measured at 1041 kg/m$^3$. From this, the packing rate of the feed carbon is calculated at 778/1041=0.747. Activated carbon is porous so that determination of the particle density thereof is difficult. However, as the feed carbon and the activated carbon both showed an identical dispersion of particle size distribution (i.e., both showing log($d_{50}$)/log (δ)=1.32), the packing rate of the activated carbon is assumed to be 0.747 to calculate a particle density of the activated carbon at 500/0.747=669 kg/m$^3$.

From the properties of the feed carbon and objective activated carbon, a fluidizing gas feed rate is calculated.

A minimum fluidization $U_{mf}$ of particles is given by a formula (1) below (Ref.: "Chemical Engineer's Handbook (Rev. 6th Ed.)" page 463 (1999)).

$$U_{mf}=0.00075(\rho_s-\rho_g)\cdot g\cdot d_p^2/\mu_g \quad (1)$$

for cases of Archimedes' number Ar satisfying the following condition:

$$Ar=\rho_g\cdot d_p^3\cdot(\rho_s-\rho_g)\cdot g/\mu_g^2<10^3 \quad (2)$$

wherein $\rho_s$: particle density [kg/m$^3$], $\rho_s=\rho_b/(1-\epsilon)$, $\rho_b$: particle packing bulk density [kg/m$^3$] (measured according to JIS K1474 (manual packing method)), $\epsilon$: Void proportion at the time of bulk density measurement:

($\epsilon$: =1−packing rate=0.253[−]), $\rho_g$: fluidizing gas density (a mixture gas of nitrogen 10 vol. % and steam 90 vol. %, 820° C.)=((18)(0.9)+(28)(0.1))(273/1093)/(22.4)=0.212 [kg/m$^3$]), g: gravitational acceleration [m/s$^2$]=9.8 m/s$^2$, dp: representative particle diameter (median-average particle size) [m], μg: fluidizing gas viscosity (steam and also nitrogen, 4×10$^{-5}$ [Pa·s] at 820° C., and Ar: Archimedes' number [−].

Archimedes number Ar as a condition for application of Formula (1) is calculated by Formula (2) as follows:

$$Ar=(0.212)(6.2\times10^{-4})^3\cdot(1041-0.212)\cdot(9.8)/(4\times10^{-5})^2=3\ldots<10^3$$

Accordingly, the minimum fluidization speed $U_{mf1}$ of the feed carbon is calculated by Formula (1) as follows:

$$U_{mf1}=0.00075\cdot(1041-0.212)\cdot(9.8)\cdot(6.2\times10^{-4})^2/(4\times10^{-5})$$
$$=0.074 \text{ m/s}$$

The present inventors have experimentally found it possible to form a stable fluidized bed in a vertical fluidized bed apparatus equipped with a plurality of horizontal perforated partitioning plates when a fluidizing gas is supplied at a rate which is 2-4 times, particularly 2-3 times, the minimum fluidization velocity $U_{mf1}$ of feed carbon particles calculated in the above manner. In a preferred specific example, 0.19 m/s, which is 2.5 times the above-obtained $U_{mf1}$=0.74 m/s, was used.

Further, the terminal velocity Ut of particles are given by Formula (3) below (Ref.: Chemical Engineer's Handbook (Rev. 6th. Ed.), page 245 (1999)):

$$U_t=(\mu_g/d_p/\rho_g)\cdot 10^{((12.5+9\log A)^{0.5}-5)}$$

$$A=4\cdot d_p^3\cdot \rho_g\cdot(\rho_s-\rho_g)\cdot g/3/\mu_g^2 \quad (3)$$

for cases of $0.1<Re<7\times10^4$ $Re=d_p\cdot U_t\cdot\rho_g/\mu_g$.

In the present invention, as for the aperture rates for the plurality of horizontal perforated partitioning plates, it is preferred to set a value for the uppermost plate which is larger by at least 10% than that for the lowermost plate (an aperture rate ratio of at least 1.1 between the uppermost and lowermost plates) corresponding to at least the increase in superficial velocity of the fluidizing gas accompanying the progress of water gas reaction. More preferably, the aperture rate of the uppermost (most downstream) horizontal perforated partitioning plate is determined based on the terminal velocity of activated carbon.

The terminal velocity Ut of activated carbon is calculated by Formula (3) above, as follows:

$$U_{t2} = (4 \times 10^{-5}/4 \times 10^{-4}/0.212) \cdot 10^{((12.5+9 \, log(4 \cdot (4 \times 10^{-4})^3 \cdot 0.212 \cdot (669 - 0.212) \cdot 9.8/3/(4 \times 10^{-5})^2))^{0.5} - 5)} = 1.2 \, m/s$$

when $Re_2 = (4 \times 10^{-4}) \cdot (1.2) \cdot (0.212)/(4 \times 10^{-5}) = 2.6$.

It is indicated in this example that the terminal velocity $U_{t2}$ of activated carbon is 1.2/0.074=16 times the minimum fluidization speed of the feed carbon.

The activation reaction is represented by two formulae of $C + 2H_2O \rightarrow CO_2 + 2H_2$ and $C + H_2O \rightarrow CO + H_2$. The proportion between the two formulae varies depending on the reaction conditions but the above two reaction formulae show at least that the fed $H_2O$ becomes 1.5-2 times in volume after the reaction. Accordingly, the discharge gas volume is increased than the feed gas by several % to several tens % while it depends also on the feed fluidizing gas rate, type of feed carbon, $H_2O$ concentration in the fluidizing gas and reaction temperature. An increase of 15% was estimated in this example based on reaction results in the batchwise experiment.

Further, in this example, the aperture rate for the uppermost horizontal perforated partitioning plate was set to be (100)(0.19)(1.15)/(1.2)=18% so that the gas velocity passing therethrough was equal to the terminal velocity $U_{t2}$=1.2 m/s of activated carbon having a highest degree of activation. Activated carbon once raised above the uppermost partitioning plate does not likely to fall back again to below the partitioning plate since the gas velocity passing through the perforations has become equal to or above the terminal velocity, so that a portion of activated carbon reacted to an appropriate degree of activation can be selectively brought to above the partitioning plates.

By generalizing the above calculation, the aperture rate A [%] of the uppermost horizontal perforated partitioning plate can be given by Formula (4) below:

$$A = (100) \cdot (U_o \cdot P)/(U_{t2}) \quad (4)$$

wherein $U_{t2}$ [m/s]: terminal velocity of activated carbon, $U_o$ [m/s]: superficial velocity of feed gas, P [-]: ratio of increase of discharge gas with respect to feed gas.

If the denominator and numerator of the right side of Formula (4) are equally divided with $U_{mf1}$, Formula (5) below is given.

$$A = (100) \cdot (U_o/U_{mf1}) \cdot P/(U_{t2}/U_{mf1}) \quad (5)$$

In cases where the terminal velocity $U_{t2}$ of activated carbon is 15-20 times the minimum fluidization velocity $U_{mf1}$ of feed carbon together with $(U_o/U_{mf1})$=2.5 and P=1.15, Formula (5) above shows it preferable to set the aperture rate A [%] of the uppermost horizontal perforated partitioning plate to be (100)(2.5)(1.15)/(15 to 20)=14 to 19%.

The aperture rates of the second to fourth horizontal perforated partitioning plates from the above can also be calculated by replacing the terminal velocity, etc. of the product activated carbon in the above calculation with the terminal velocity, etc., of feed carbon passing therethrough. For the lower plates, the conversions become lower to provide successively larger terminal velocities, the aperture rates are successively decreased as has been described with reference to the apparatus of FIG. 1. More specifically, in the embodiment of FIG. 1, based on similar calculations, the aperture rate of the second plate was set to 15%, the aperture rate of the third plate was set to 12%, and the aperture rate of the fourth plate was set to 9%. It is generally preferred to determine the aperture rate for each horizontal perforated partitioning plate so that the gas velocity passing therethrough will be 0.8-1.2 times, more preferably 0.9-1.1 times, the terminal velocity of reacted carbon passing therethrough at a highest degree of activation. Below 0.8 times, the velocity of carbon particles passing through the perforation plate is liable to be insufficient relative to the terminal velocity of the carbon particles, and in excess of 1.2 times, the velocity of carbon particles passing through the perforation plate becomes excessively large relative to the terminal velocity of the carbon particles. Either case is not preferable because the rectifying and classification effect is liable to be lowered.

In ordinary cases, a more preferable aperture rate ratio between the uppermost and lowermost partitioning plates falls within a range of 1.1-3.0 times.

The perforations in the partitioning plate 4 may have an aperture diameter of at most 200 times, preferably at most 100 times, the median-average particle size of feed carbon so as to provide an equal classification effect regardless of the location thereof in the partitioning plate. It is preferred to form a large number of perforations having a small aperture diameter, but unless the aperture diameter is at least 5 times, preferably at least 10 times, the median-average particle size of feed carbon, an undesirably large resistance to passage of the particles is liable to result. The arrangement of perforations may suitably be a square arrangement, a regular triangle arrangement, a staggered arrangement, etc., but any arrangement can be adopted provided that the perforations are uniformly formed and an uniform aperture rate per unit area of partitioning plate can be provided over the entire partitioning plate.

According to the present inventors' knowledge, the horizontal perforated partitioning plates may well be set with an arbitrary spacing in the height direction on the order of 20-300 mm, preferably 50-200 mm, and a somewhat larger number of partitioning plates may be provided within the above-mentioned range of set spacing in order to provide a narrower conversion distribution.

The classification between feed carbon and activated carbon according to the horizontal perforated partitioning plates is based on a finding that feed carbon is caused to have smaller particle size and particle density (apparent density) and effected by utilizing the differences. The use of a feed carbon having a broad particle size distribution makes it difficult to effect a separation between a particle having a large particle size and a small particle density and a particle having a small particle size and a large particle density through a partitioning plate, thus providing a cause of a nonuniform conversion of activated carbon. Accordingly, for more effective achievement of the present invention, it is preferred to adjust the particle size distribution of feed carbon to be narrower in advance. Moe specifically, it is preferred to use such a feed carbon as to show a logarithmic ratio log $(d_{50})/log(\delta)$ of at least 1.25, preferably at least 1.30, between the median-average particle size $(d_{50})$ and standard deviation $(\delta)$ based on a distribution measured according to the JIS K1474 particle size measurement method.

According to the process of the present invention, it is possible to produce activated carbon showing a packing bulk density of 480-550 kg/m³ (or a Methylene Blue decoloring power of 240-320 ml/g) at a yield of 18-33 wt. %.

EXAMPLES

Hereinbelow, the present invention will be described more specifically based on Examples and Comparative Examples.

Example 1

In an apparatus for continuous production of activated carbon as schematically illustrated in FIG. 1, an activated carbon production apparatus main body 2 was disposed to have an inner diameter of 300 mm and provided with an activated carbon discharge tube 9 having an upper end opening at a height of 460 mm from the apparatus bottom plate and four horizontal perforated partitioning plates 4 with a spacing in a height direction of 100 mm each, wherein the respective partitioning plates disposed from the uppermost to the lower positions were provided with perforations of 12.0 mm, 10.9 mm, 9.8 mm and 8.5 mm, respectively, in diameter, in a square arrangement at a pitch of 25 mm in each case to provide aperture rates of 18%, 15%, 12%, and 9%, respectively. In the activated carbon apparatus main body 2, the internal temperature detected by a thermometer 7d was adjusted at 820° C. by a side wall heater 8, and a mixture fluidizing gas comprising nitrogen 10 vol. % and steam 90 vol. % was heated by a fluidizing gas heater 6 and supplied through a fluidizing gas disperser 5 into a fluidized bed at a superficial velocity at 820° C. of 0.19 m/s. As the feed carbon, a spherical feed carbon was prepared from petroleum pitch by oxidation-infusibilization and then preliminary carbonization in nitrogen gas at 550° C. to have a median-average particle size ($d_{50}$) of 620 μm and a standard deviation (δ) of 130 μm (both calculated from a particle size distribution according to JIS K1474: particle size measurement method), and also a packing bulk density of 778 kg/m³ (measured according to JIS K1474: manual packing density measurement method). The feed carbon was supplied from a starting material supplier 1 through a starting material supply tube 3 into the apparatus main body 2 and subjected to continuous fluidized bed activation reaction under supply of the above-mentioned fluidizing gas, whereby in a steady state, a spherical activated carbon showing a packing bulk density of 520 kg/m³ was produced at a rate of 240 g/h in an activated carbon recovery vessel 11 through an activated carbon discharge tube 9 from the feed carbon supplied at 1000 g/h. Thus, the yield of activated carbon from the feed carbon was 24 wt. %. The activated carbon showed a Methylene Blue (MB) decoloring power (as measured according to JWWA K113) of 290 ml/g.

Example 2

An identical apparatus as used in Example 1 was used except that among the four horizontal perforated partitioning plates*, only the two plates having aperture rates of 18% and 15%, respectively, were left and the lower two horizontal perforated partitioning plates were removed. When the operation of Example 1 under identical compositions and flow rates of feed carbon and fluidizing gas and an identical operation temperature was performed, an activated carbon having a packing bulk density of 530 kg/m³ was obtained in the activated carbon recovery vessel 11 at a yield of 24 wt. % with respect to the feed carbon and showed a Methylene Blue decoloring power of 280 ml/g.

Example 3

An identical apparatus as used in Example 1 was used except that among the four horizontal perforated partitioning plates, the uppermost and lowermost horizontal perforated partitioning plates having aperture rates of 18% and 19%, respectively, were removed, and the middle two horizontal perforated partitioning plates having aperture rates of 15% and 12% were moved to the positions of the uppermost and second horizontal perforated partitioning plates. When the operation of Example 1 was performed under identical composition and flow rate of fluidizing gas and an identical operation temperature except for changing the feed rate of an identical composition of the feed carbon from 1000 g/h to 2000 g/h, an activated carbon having a packing bulk density of 550 kg/m³ was obtained in the activated carbon recovery vessel 11 at a yield of 30 wt. % with respect to the feed carbon and showed a Methylene Blue decoloring power of 240 ml/g.

Comparative Example 1

An identical apparatus as used in Example 1 was used except that all the four horizontal perforated partitioning plates disposed with a spacing in height direction of 100 mm each were provided with perforations of 9 mm in diameter in a square arrangement at a pitch of 25 mm to provide an aperture rate of 10%. When the operation of Example 1 under identical compositions and flow rates of feed carbon and fluidizing gas and an identical operation temperature was performed, an activated carbon having a packing bulk density of 510 kg/m³ was obtained in the activated carbon recovery vessel 11 at a yield of 16 wt. % with respect to the feed carbon and showed a Methylene Blue decoloring power of 280 ml/g.

Comparative Example 2

An identical apparatus as used in Example 1 was used except that all the four horizontal perforated partitioning plates disposed with a spacing in height direction of 100 mm each were provided with perforations of 12.6 mm in diameter in a square arrangement at a pitch of 25 mm to provide an aperture rate of 20%. When the operation of Example 1 under identical compositions and flow rates of feed carbon and fluidizing gas and an identical operation temperature was performed, an activated carbon having a packing bulk density of 530 kg/m³ was obtained in the activated carbon recovery vessel 11 at a yield of 16 wt. % with respect to the feed carbon and showed a Methylene Blue decoloring power of 240 ml/g.

Reference Example 1

An apparatus formed by removing the four horizontal perforated partitioning plates from the apparatus of Example 1 was charged with 15 kg of the feed carbon and subjected to a batchwise operation while using identical composition and flow rate of fluidizing gas and an identical operation temperature, whereby an activated carbon having a packing bulk density of 490 kg/m³ was obtained in 3.3 kg (at a yield of 22 wt. %) to show a Methylene Blue decoloring power of 310 ml/g. One batch operation time was totally 33 hours inclusive of charging time+heating time for temperature elevation+reaction time+cooling time. Thus, the production rate was 100 g/h, which is 1/2.4 of 240 g/h, the steady production rate in Example 1.

Reference Example 2

A batchwise operation was performed in the same manner as in Reference Example 1 except for reducing the reaction time (and accordingly the degree of activation reaction) to obtain an activated carbon having a packing bulk density of 600 kg/m$^3$ at a yield of 43 wt. %. Methylene Blue decoloring power was 240 ml/g.

Reference Example 3

A batchwise operation was performed in the same manner as in Reference Example 1 except for reducing the reaction time (and accordingly the degree of activation reaction) to obtain an activated carbon having a packing bulk density of 645 kg/m$^3$ at a yield of 52 wt. %. Methylene Blue decoloring power was 210 ml/g.

Reference Example 4

A batchwise operation was performed in the same manner as in Reference Example 1 except for reducing the reaction time (and accordingly the degree of activation reaction) to obtain an activated carbon having a packing bulk density of 730 kg/m$^3$ at a yield of 67 wt. %. Methylene Blue decoloring power was 70 ml/g.

The outlines of the above Examples, Comparative Examples and Reference Examples are summarized in Table 1 below.

From Formula (6), a logarithmic value and a reaction time show a linear relationship giving a slower yield reduction speed with the lapse of reaction time. Accordingly, at an equal average reaction time, a broader reaction time distribution results in a product containing more fraction of low conversion and a lower average conversion. On the other hand, at an equal average conversion, a broader reaction time distribution requires a longer average reaction period leading to a lower yield. Accordingly, in order to obtain an activated carbon having an equal packing bulk density, a narrower conversion distribution leads to a higher yield, and a maximum yield is attained by a batchwise operation. In a continuous operation, the reaction time distribution is liable to be broader than in batchwise operation, thus resulting in an inevitably lower conversion.

FIG. 2 shows relationships between activated carbon yield and bulk density which are indicated as linear relationships including a line obtained by connecting the results of Reference Examples 1-4 (that were operated batchwise) and representing a highest value of yield at a certain packing bulk density. While the yield of Example 1 was 24 wt. %, FIG. 2 shows that an activated carbon having an identical packing bulk density of 520 kg/m$^3$ can be obtained at a yield of 28 wt. % according to a batchwise operation, so that the yield of Example 1 corresponds to a relative yield of 24/28=0.86. In the same manner, as shown in Table 1, Example 2 gives a relative yield of 24/30=0.80; Comparative Example 1, 16/26=0.67; and Comparative Example 2, 16/30=0.53.

TABLE 1

|  | Plot marks in FIGS. 2 and 3 | Reaction scheme | Aperture rates of Partitioning Plates (from the above) [%] | Packing bulk density [kg/m$^3$] | MB decoloring power [ml/g] | Yield [Wt. %] | Relative yield* |
|---|---|---|---|---|---|---|---|
| Feed carbon |  |  |  | 778 |  |  |  |
| Example |  |  |  |  |  |  |  |
| 1 | ○ | continuous | 18, 15, 12, 9 | 520 | 290 | 24 | 0.86 |
| 2 | ○ | continuous | 18, 15 | 530 | 280 | 24 | 0.8 |
| 3 | ○ | continuous | 15, 12 | 550 | 240 | 30 | 0.8 |
| Comp. 1 | Δ | continuous | 10 × 4 | 510 | 280 | 16 | 0.62 |
| Comp. 2 | □ | continuous | 20 × 4 | 530 | 240 | 16 | 0.53 |
| Ref. 1 | ● | batch | — | 490 | 310 | 22 | (1.0) |
| Ref. 2 | ● | batch | — | 600 | 240 | 43 | — |
| Ref. 3 | ● | batch | — | 645 | 210 | 52 | — |
| Ref. 4 | ● | batch | — | 730 | 70 | 67 | — |

*Relative yield with respect to the batchwise operation after normalization in the case of producing activated carbon having a packing density of 520 [kg/m$^3$].

Further, FIGS. 2 and 3 show plots of activated carbon yield—bulk density and a graph of activated carbon yield—MB (Methylene Blue) decoloring power, respectively, as reference data for evaluating the process performances of the above examples.

Evaluation of the results shown in FIGS. 2 and 3 is explained supplementary below.

It is known that the activation reaction can be regarded as a first-order reaction at a constant feed steam concentration and a relationship between yield (y) of activated carbon with respect to starting carbon and activation reaction time (t) is expressed by Formula (6) shown below (Ref.: KITAGAWA, Nikkashi (Bulletin of the Chemical society of Japan), No. 6 page 1140 (1972)).

$$-\log(y) = Kt \qquad (6),$$

wherein K denotes an apparent reaction velocity constant.

Accordingly, it is understood that the process of the present invention provides activated carbon of a desired packing bulk density at a high yield which is very close to the yield attained by a batchwise operation, by a continuous operation. Particularly, Example 2 provided activated carbon at a higher yield than Comparative Examples 1 and 2, regardless of a fewer number of the disposed partitioning plates than in these Comparative Examples.

This is understood to be an effect attributable to an improved rectifying and classification effect in a continuous fluidized bed apparatus and accordingly a narrower reaction time distribution in the product activated carbon according to the present invention wherein the aperture rates of plural horizontal perforated partitioning plates are increased at upper (downstream) positions so as to be commensurate with the terminal velocity of the reacted carbon.

FIG. 3 shows a relationship between activated carbon yield and Methylene Blue decoloring power. Methylene Blue decoloring power also represents a degree of progress of activation reaction. Similarly as the relationship between packing bulk density and yield, in order to obtain an activated carbon having an equal Methylene Blue decoloring power, a narrower conversion distribution affords a higher yield, and at a constant yield, a maximum Methylene Blue decoloring power is given by a batchwise operation. As shown in FIG. 3, it is understood that Example 1 provided an activated carbon showing a high Methylene Blue decoloring power comparable to Reference Examples 1-4 according to batchwise operation at a high yield by a continuous operation.

It is however to be noted that as described in Reference Example 1 in comparison with Example 1, the continuous activated carbon production process according to the present invention affords, in its steady state, a productivity which is two or larger times that of a batchwise operation and moreover remarkably alleviates the problem of shortening of apparatus life in the batchwise operation due to heating and cooling operations required in each batch, thus providing great improvement in commercial production.

INDUSTRIAL APPLICABILITY

As described above, the present invention provides an apparatus and a process affording continuous production of even an activated carbon of a high degree of activation at a high yield comparable to that attained by a batchwise operation.

SYMBOLS

Figure 1:
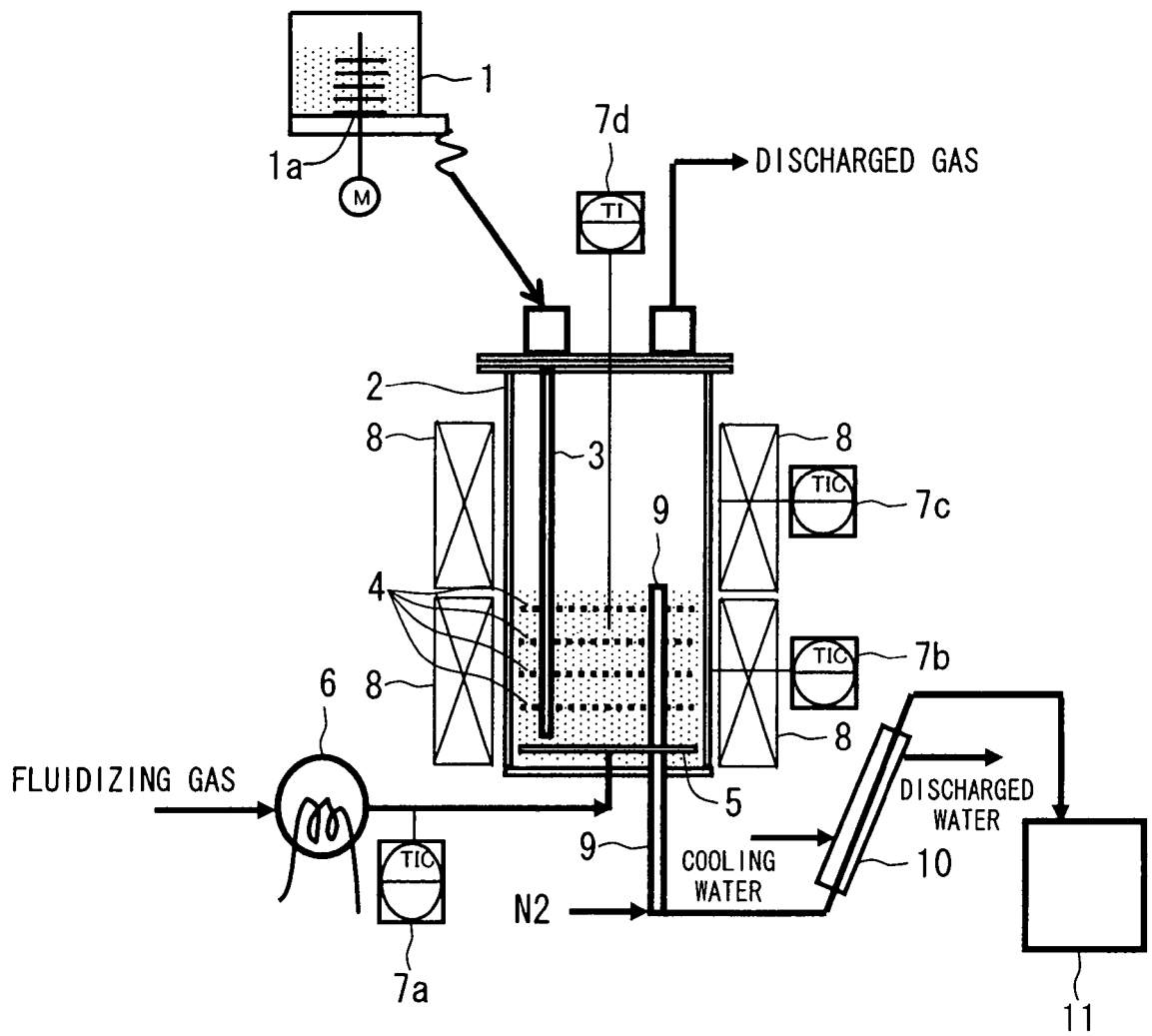
FIG. 1 is a schematic layout view of an embodiment of the continuous operation type activated carbon production apparatus of the invention.
Figure 2:
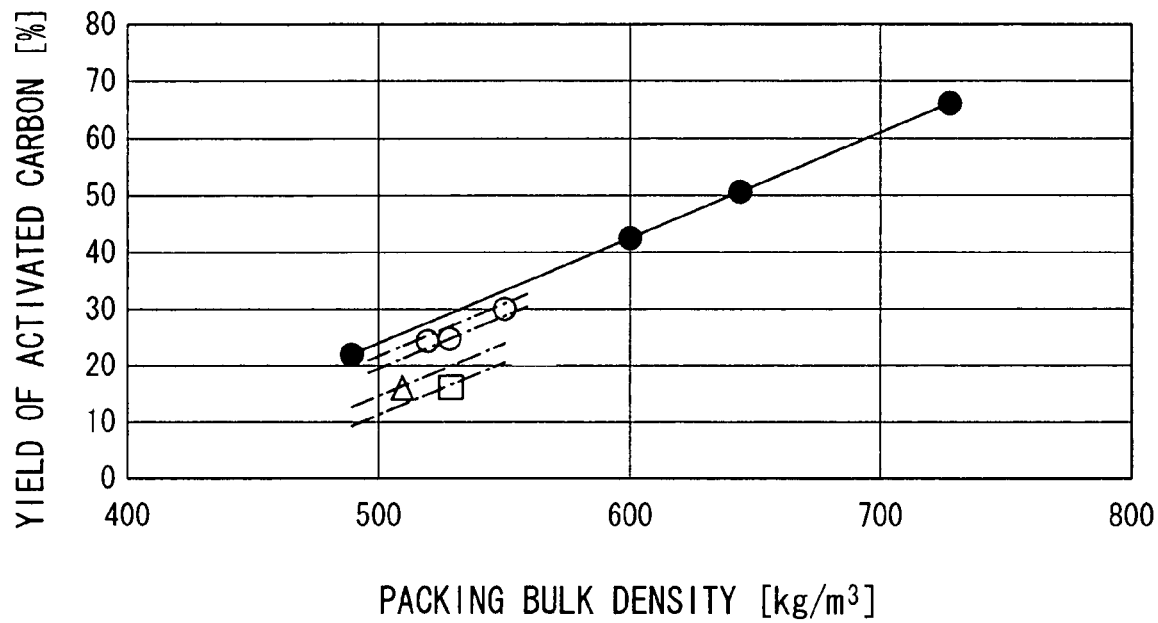
FIG. 2 is a graph showing relationships between activated carbon yield and bulk density based on Examples, Comparative Examples and Reference Examples.
Figure 3:
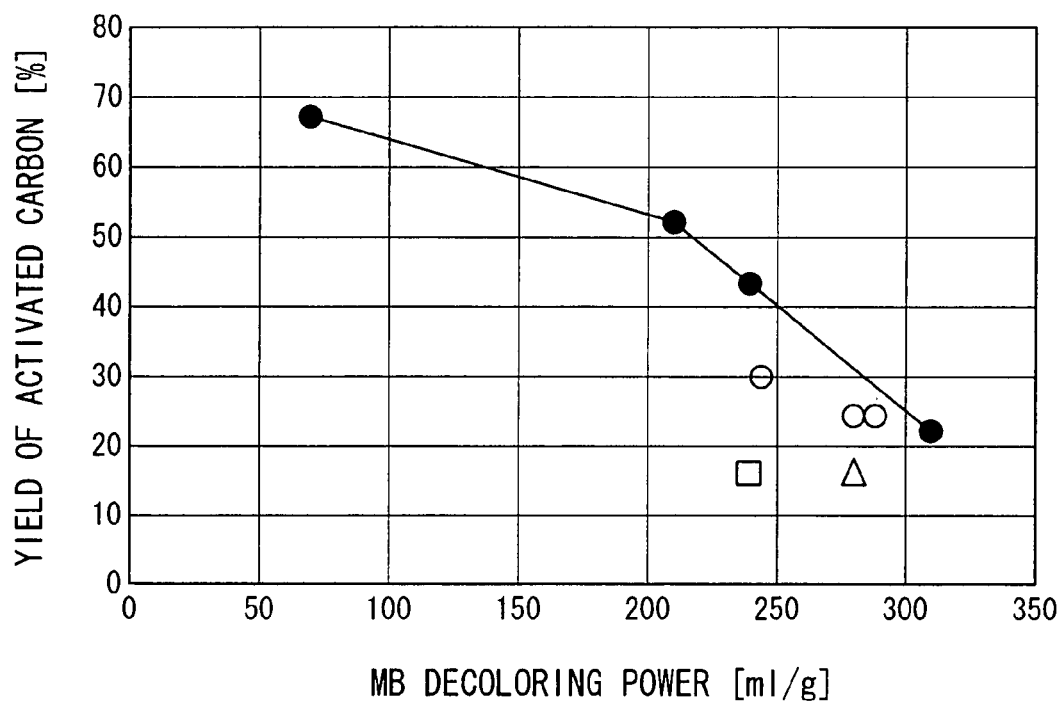
FIG. 3 is a graph showing relationships between activated carbon yield—MB (Methylene Blue) decoloring power.

1: starting material supplier,
2: activated carbon AC production apparatus main body,
3: feed carbon supply tube,
4: horizontal perforated partitioning plate,
5: fluidizing gas disperser, 6: fluidizing gas heater,
7a-7c: temperature indicating controller, 7d: thermometer,
8: apparatus main body side-wall heater,
9: product activated carbon discharge tube,
10: cooler, 11: product activated carbon recovery vessel.

The invention claimed is:

1. A continuous operation type apparatus for producing activated carbon, comprising a vertical multi-stage fluidized bed apparatus including a plurality of horizontal perforated partitioning plates disposed therein so as to partition the apparatus, for continuously supplying feed carbon and a fluidizing gas containing steam from a lower part of the apparatus and from a lower side than the plurality of horizontal perforated partitioning plates to fluidize the feed carbon with the fluidizing gas and activate the feed carbon with steam, and discharging activated carbon from an upper part of the apparatus, wherein an upper horizontal perforated partitioning plate is set to have a larger aperture rate than a lower horizontal perforated partitioning plate.

2. An apparatus according to claim 1, wherein each horizontal perforated partitioning plate has such an aperture rate as to provide a gas velocity passing through apertures of each horizontal perforated partitioning plate which is 0.8-1.2 times a terminal velocity of reacted carbon having acquired a highest degree of activation passing therethrough provided that the fluidizing gas is supplied so as to exhibit a gas superficial velocity in the fluidized bed which is 2-4 times a minimum fluidizing velocity of the feed carbon.

3. An apparatus according to claim 1, wherein an uppermost horizontal perforated partitioning plate has an aperture rate of 14-19%.

4. An apparatus according to claim 1, wherein an uppermost horizontal perforated partitioning plate has an aperture rate which is at least 1.1 times that of a lowermost horizontal perforated partitioning plate.

5. An apparatus according to claim 1, wherein each horizontal perforated partitioning plate has a perforation diameter which is 5-200 times a median-average particle size of the feed carbon.

6. A process for producing activated carbon, comprising operating an apparatus according to claim 1 through the steps of:

continuously supplying, from a lower part of the apparatus and from a lower side than the plurality of horizontal perforated partitioning plates, feed carbon and fluidizing gas containing steam at a superficial velocity of the gas which is 2-4 times a minimum fluidizing velocity of the feed carbon, thereby to fluidize the feed carbon and activate the feed carbon with steam at 750-950° C., and continuously discharging the activated carbon from an upper part of the apparatus.

7. A production process according to claim 6, wherein the activated carbon shows a terminal velocity which is 15-20 times the minimum fluidizing velocity of the feed carbon.

8. A production process according to claim 6, wherein the feed carbon has such a particle size distribution (as measured according to JIS K1474: particle size measurement method) as to exhibit a median-average particle size ($d_{50}$) and a standard deviation giving a logarithmic ratio log ($d_{50}$)/log ($\delta$) of at least 1.25.

9. A production process according to claim 6, wherein the fluidizing gas is supplied from a disperser disposed below the lowermost partitioning plate and the feed carbon is supplied between the lowermost partitioning plate and the disperser.

10. An apparatus according to claim 1, wherein an uppermost one of the horizontal perforated partitioning plates has an aperture rate which is 1.1-3.0 times that of a lowermost one of the horizontal perforated partitioning plates.

11. A production process according to claim 6, wherein an uppermost one of the horizontal perforated partitioning plates has an aperture rate which is 1.1-3.0 times that of a lowermost one of the horizontal perforated partitioning plates.

* * * * *